(12) United States Patent
Pfaff (10) Patent No.: US 10,268,214 B2
(45) Date of Patent: Apr. 23, 2019

(54) SYSTEMS AND METHODS FOR ELECTROHYDRAULIC VALVE CALIBRATION

(71) Applicant: HUSCO INTERNATIONAL, INC., Waukesha, WI (US)

(72) Inventor: Joseph L Pfaff, Wauwatosa, WI (US)

(73) Assignee: HUSCO International, Inc., Waukesha, WI (US)

( * ) Notice: Subject to any disclaimer, the term of this patent is extended or adjusted under 35 U.S.C. 154(b) by 195 days.

(21) Appl. No.: 15/453,729

(22) Filed: Mar. 8, 2017

(65) Prior Publication Data

US 2017/0262001 A1 Sep. 14, 2017

Related U.S. Application Data

(60) Provisional application No. 62/305,318, filed on Mar. 8, 2016.

(51) Int. Cl.
*G05D 16/20* (2006.01)
*F16K 37/00* (2006.01)
*F15B 19/00* (2006.01)
*G01F 25/00* (2006.01)

(52) U.S. Cl.
CPC ....... *G05D 16/2026* (2013.01); *F15B 19/002* (2013.01); *F16K 37/005* (2013.01); *G01F 25/0007* (2013.01); *F15B 2211/20546* (2013.01); *F15B 2211/3111* (2013.01); *F15B 2211/327* (2013.01); *F15B 2211/45* (2013.01); *F15B 2211/6309* (2013.01)

(58) Field of Classification Search
CPC .......... G05D 16/2026; G05D 16/2046; G05D 16/2066; G05D 16/02; F16K 37/005; F16K 37/0075; F16K 37/0091; F16K 37/0083
USPC .............................. 73/1.01, 1.57, 1.72, 168
See application file for complete search history.

(56) References Cited

U.S. PATENT DOCUMENTS

| | | | |
|---|---|---|---|
| 6,397,655 B1 | 6/2002 | Stephenson | |
| 7,997,117 B2 | 8/2011 | Zhang et al. | |
| 9,279,736 B2 | 3/2016 | Hughes et al. | |
| 9,568,119 B2 | 2/2017 | Janson et al. | |

*Primary Examiner* — Robert R Raevis
(74) *Attorney, Agent, or Firm* — Quarles & Brady LLP (57) ABSTRACT

Systems and methods for calibration of an electrohydraulic control valve are provided. In one aspect, a method for calibrating an electrohydraulic control valve includes providing fluid communication between the pump and the reservoir through a bypass calibration orifice. The bypass calibration orifice defines a known restriction. The method further includes measuring a pressure drop across the bypass calibration orifice, commanding the electrohydraulic control valve, calculating a pressure drop across the electrohydraulic control valve, recording the command applied to the electrohydraulic control valve corresponding with the calculated pressure drop across the electrohydraulic control valve, and calibrating the electrohydraulic control valve based on at least two of the recorded command, the known restriction, the measured pressure drop across the bypass calibration orifice, and the calculated pressure drop across the electrohydraulic control valve.

29 Claims, 5 Drawing Sheets

SYSTEMS AND METHODS FOR ELECTROHYDRAULIC VALVE CALIBRATION

CROSS-REFERENCES TO RELATED APPLICATIONS

The present application is based on, claims priority to, and incorporates herein by reference in its entirety, U.S. Provisional Patent Application No. 62/305,318, filed on Mar. 8, 2016, and entitled "Valve Calibration Against Fixed Area."

STATEMENT REGARDING FEDERALLY SPONSORED RESEARCH

Not Applicable.

BACKGROUND

The present disclosure relates generally to hydraulic systems for use on mobile machinery and, more specifically, to systems and methods for electrohydraulic valve calibration.

Electrohydraulic valve may be implemented in hydraulic systems on mobile machinery to provide a variety of fluid flow control functions based on an electrical input from a controller. For example, electrohydraulic valves may be used to direct pressurized fluid to a function on the mobile machine, provide fluid communication between a function on the mobile machine and a reservoir, and regulate a fluid pressure, to name a few. Typically in hydraulic systems with electrohydraulic valves, it is common to require a calibration in an attempt to remove the impact of component tolerances from the performance of the overall system.

SUMMARY OF THE INVENTION

The present disclosure provides systems and methods for electrohydraulic valve calibration. In one aspect, the present disclosure provides a method for calibrating an electrohydraulic control valve in a hydraulic system. The hydraulic system includes a pump, a reservoir, a bypass control valve, and at least one function. The electrohydraulic control valve includes at least one workport in fluid communication with the function. The method includes providing fluid communication between the pump and the reservoir through a bypass calibration orifice. The bypass calibration orifice defines a known restriction. The method further includes measuring a pressure drop across the bypass calibration orifice, commanding the electrohydraulic control valve, calculating a pressure drop across the electrohydraulic control valve, recording the command applied to the electrohydraulic control valve corresponding with the calculated pressure drop across the electrohydraulic control valve, calibrating the electrohydraulic control valve based on at least two of the recorded command, the known restriction, the measured pressure drop across the bypass calibration orifice, and the calculated pressure drop across the electrohydraulic control valve.

In one aspect, the present disclosure provides a hydraulic system operable to calibrate an electrohydraulic control valve. The hydraulic system includes a pump and a bypass control valve movable between a first position where fluid communication is provided between the pump and the reservoir through a bypass calibration orifice and a second position where fluid communication is inhibited between the pump and the reservoir. The bypass calibration orifice defines a known restriction. The hydraulic system further includes a function control valve including at least one workport in fluid communication with a function, a calibration pressure sensor arranged to measure a pressure downstream of the pump and upstream of the at least one workport, and a controller in electrical communication with the pump, the bypass control valve, the function control valve, and the calibration pressure sensor. The controller is configured to command the pump to a non-zero displacement and command the bypass control valve to the first position, obtain a reference pressure value from the calibration pressure sensor, command the function control valve, calculate a pressure drop across the function control valve, record a command applied to the function control valve corresponding with the pressure drop across the function control valve, and calibrate the function control valve based on at least two of the recorded command, the known restriction of the bypass calibration orifice, the reference pressure value, and the pressure drop across the function control valve.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DESCRIPTION OF DRAWINGS

The invention will be better understood and features, aspects and advantages other than those set forth above will become apparent when consideration is given to the following detailed description thereof. Such detailed description makes reference to the following drawings

DETAILED DESCRIPTION OF THE INVENTION

The use of the terms "downstream" and "upstream" herein are terms that indicate direction relative to the flow of a fluid. The term "downstream" corresponds to the direction of fluid flow, while the term "upstream" refers to the direction opposite or against the direction of fluid flow.

Figure 1:
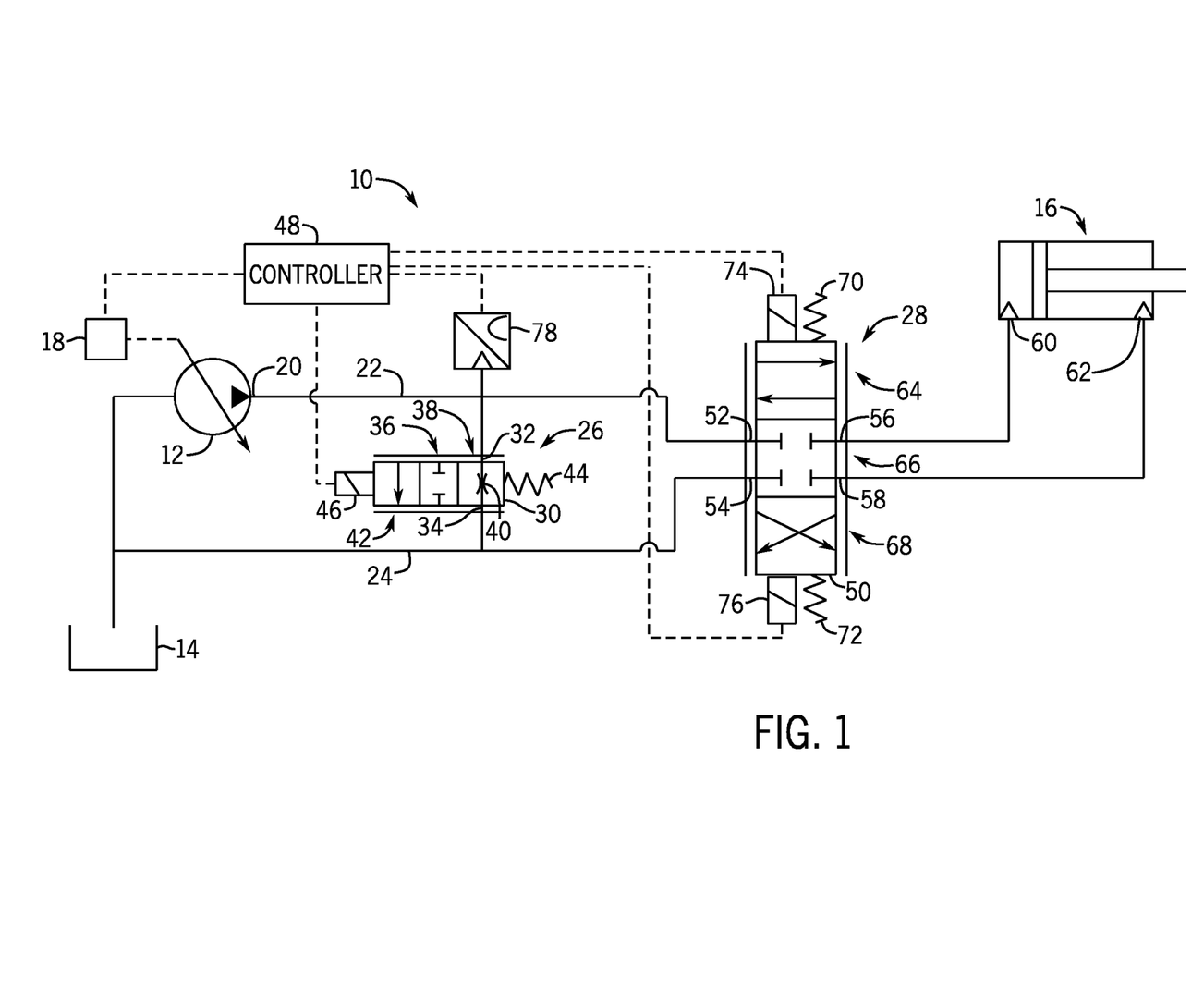
FIG. 1 is a schematic illustration of a hydraulic system operable to perform a calibration of an electrohydraulic valve according to one aspect of the present disclosure.

FIG. 1 illustrates one non-limiting example of a hydraulic system 10 operable to perform a calibration of one or more electrohydraulic control valves according to one aspect of the present disclosure. The hydraulic system 10 can include a pump 12, a reservoir 14, and a function 16. In the illustrated non-limiting example, the pump 12 can be a variable displacement pump driven by drive mechanism (e.g., an internal combustion engine, an electric motor, etc.) with an input mechanism 18 used to vary the displacement of the pump 12. In other non-limiting examples, the pump 12 may be a fixed displacement pump.

The pump 12 can be configured to draw fluid, such as oil, from the reservoir 14 and furnish the fluid under increased pressure at a pump outlet 20. The pump outlet 20 can be in fluid communication with a supply conduit 22. A return conduit 24 can be in fluid communication with the reservoir 14.

The hydraulic system 10 can include a bypass control valve 26 and a function control valve 28 configured to control a flow of fluid between the function 16 and the pump 12 and the reservoir 14. It should be appreciated that the number of functions and corresponding function control valves illustrated in the hydraulic system 10 is not meant to be limiting in any way and, in other non-limiting examples, the hydraulic system 10 may include more than one function 16 and a corresponding number of function control valves 28. In some non-limiting examples, the hydraulic system 10 may include a plurality of valve sections arranged in a single monolithic body or in physically separate valve sections attached side by side.

The bypass control valve 26 may include a bypass spool 30 moveable between three positions. In other non-limiting examples, the bypass spool 30 may be moveable between more or less than three positions. The bypass control valve 26 can include a bypass inlet port 32 and a bypass outlet port 34. It should be appreciated that the number or ports on the bypass control valve 26 is not meant to be limiting in any way. In other non-limiting examples, the bypass control valve 26 may be designed to include more or less than two ports. The bypass inlet port 32 can be in fluid communication with the supply conduit 22 and the bypass outlet port 34 can be in fluid communication with the return conduit 24.

When the bypass spool 30 is actuated to a first bypass position 36, fluid communication may be provided between the bypass inlet port 32 and the bypass outlet port 34 through a bypass calibration orifice 40. Thus, in the first bypass position 36, fluid communication may be provided from the pump outlet 20 to the reservoir 14 through the bypass calibration orifice 40. In the illustrated non-limiting example, the bypass calibration orifice 40 may be a fixed orifice that defines a known or predetermined flow coefficient, or flow factor ($K_v$). In the illustrated non-limiting example, when the bypass spool 30 is in a second bypass position 38, fluid communication may be inhibited between the bypass inlet port 32 and the bypass outlet port 34. When the bypass spool 30 is actuated to a third bypass position 42, fluid communication may be provided between the bypass inlet port 32 and the bypass outlet port 34.

The bypass control valve 26 may be normally biased into the first bypass position 36 by a bypass spring 44. Actuation of the bypass control valve 26 may be controlled by a bypass solenoid 46, which is in electrical communication with a controller 48. In other non-limiting examples, the bypass control valve 26 may be actuated by a pilot signal provided by another spool valve. In operation, an electrical signal (e.g., a current) may be selectively applied to the bypass solenoid 46 by the controller 48. In response to receiving the electrical signal from the controller 48, the bypass solenoid 46 may actuate the bypass spool 30 from the first bypass position 36 toward either the second bypass position 38 or the third bypass position 42 in proportion to a magnitude of the electrical signal. Thus, the magnitude of the electrical signal supplied by the controller 48 can proportionally correspond with an actuation position of the bypass spool 30 between the first bypass position 36 and the third bypass position 42.

Figure 2:
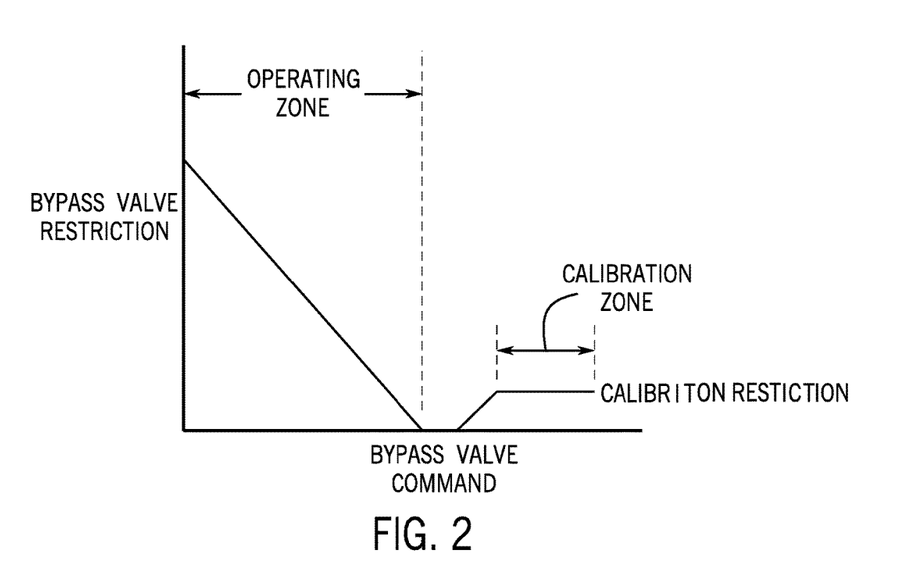
FIG. 2 is a graph illustrating one example of a relationship between a restriction through a bypass control valve of the hydraulic system of FIG. 1 as a function of command.
Figure 3:
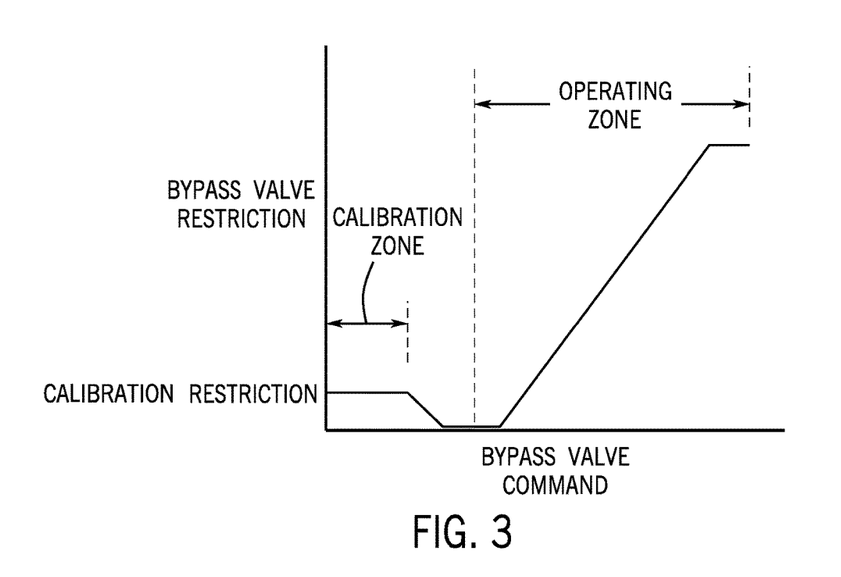
FIG. 3 is a graph illustrating another example of a relationship between a restriction through a bypass control valve of the hydraulic system of FIG. 1 as a function of command.
Figure 4:
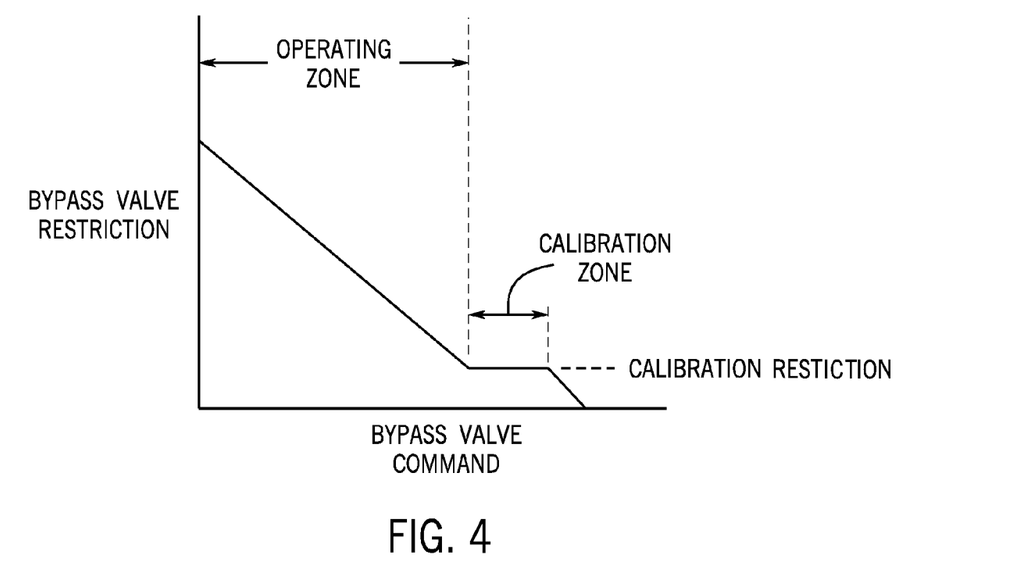
FIG. 4 is a graph illustrating yet another example of a relationship between a restriction through a bypass control valve of the hydraulic system of FIG. 1 as a function of command.

It should be appreciated that the order of the positions on the bypass spool 30 is not meant to be limiting in any way. That is, a restriction defined between the bypass inlet port 32 and the bypass outlet port 34 and a command applied to the bypass control valve 26 may take any form, as long as there is at least one section that defines a predetermined restriction, which is governed by the bypass calibration orifice 40. For example, FIGS. 2-4 illustrate three non-limiting examples of a restriction defined by the bypass control valve 26 as a function of command applied to the bypass control valve 26. As shown in FIGS. 2-4, the portion of the restriction curve that defines a known restriction (i.e., the command that corresponds with the bypass calibration orifice 40 arranged between the bypass inlet port 32 and the bypass outlet port 34) may occur at different command values. The important factor is that the restriction curve includes at least a portion that defines an accurately known restriction. Thus, there are numerous other possibilities for a restriction defined by the bypass control valve 26 as a function of command thereto, and FIGS. 2-4 illustrate only three of the possible non-limiting examples.

With reference to FIG. 1, the function control valve 28 may include a function spool 50 movable between three positions. In other non-limiting examples, the function spool 50 may include more or less than three positions. The function control valve 28 can include a function inlet port 52, a function outlet port 54, a first workport 56, and a second workport 58. It should be appreciated that the number or ports on the function control valve 28 is not meant to be limiting in any way. In other non-limiting examples, the function control valve 28 may be designed to include more or less than four ports.

The function inlet port 52 can by in fluid communication with the supply conduit 22, and the function outlet port 54 can be in fluid communication with the return conduit 24. The first workport 56 can be in fluid communication with a first function port 60 of the function 16, and the second workport 58 can be in fluid communication with a second function port 62 of the function 16. In the illustrated non-limiting example, the function 16 is a hydraulic actuator. In other non-limiting examples, the function 16 may be another implement required to be powered by fluid controlled by the function control valve 28 (e.g., a motor).

In the illustrated non-limiting example, when the function spool 50 is actuated to a first position 64, fluid communication can be provided between the function inlet port 52 and the first workport 56, and fluid communication can be provided between the second workport 58 and the function outlet port 54. When the function spool 50 is in a second position 66, fluid communication can be inhibited between any of the ports 52, 54, 56, and 58. When the function spool 50 is actuated to a third position 68, fluid communication can be provided between the function inlet port 52 and the second workport 58, and fluid communication can be provided between the first workport 56 and the function outlet port 54.

The function control valve 28 may be normally biased into the second position 66 by a first spring 70 and an opposing second spring 72. Actuation of the function control valve 28 may be controlled by a first function solenoid 74 and a second function solenoid 76. The function solenoid 74 and the second function solenoid 76 can be in electrical communication with the controller 48. In other non-limiting examples, the function control valve 28 may be actuated by one or more pilot signals provided by one or more spool valves. In operation, an electrical signal (e.g., a current) may be selectively applied to the first function solenoid 74 and/or the second function solenoid 76 by the controller 48. If it is desired to move the function spool 50 toward the first position 64, the controller 48 may provide an electrical signal to the first function solenoid 74. In response, the first function solenoid 74 may actuate the function spool 50 toward the first position 64 in proportion to a magnitude of the electrical signal. Conversely, if it is desired to move the function spool 50 toward the third position 68, the controller 48 may provide an electrical signal to the second function solenoid 76. In response, the second function solenoid 76 may actuate the function spool 50 toward the third position 68 in proportion to a magnitude of the electrical signal. Thus, the magnitude of the electrical signal supplied by the controller 48 to the first function solenoid 74 or the second function solenoid 76 can proportionally correspond with an actuation position of the function spool 50 between the first position 64 or the third position 68.

A calibration pressure sensor 78 can be configured to measure a pressure in the supply conduit 22 upstream of the bypass inlet port 32. The calibration pressure sensor 78 may be in electrical communication with the controller 48.

The hydraulic system 10 may be operable to perform a calibration of the function control valve 28 to remove the impact of component tolerances from the performance of the overall system. Specifically, as will be described below, the use of the bypass calibration orifice 40 with a predetermined flow factor and the calibration pressure sensor 78 facilitates the calibration of the function control valve 28. However, it should be appreciated that the specific design of the components within the hydraulic system 10 is not meant to be limiting in any way. That is, the systems and methods for valve calibration described herein may be applied to any hydraulic system including one or more electrohydraulic valves connected to control fluid flow to a function.

Figure 5:
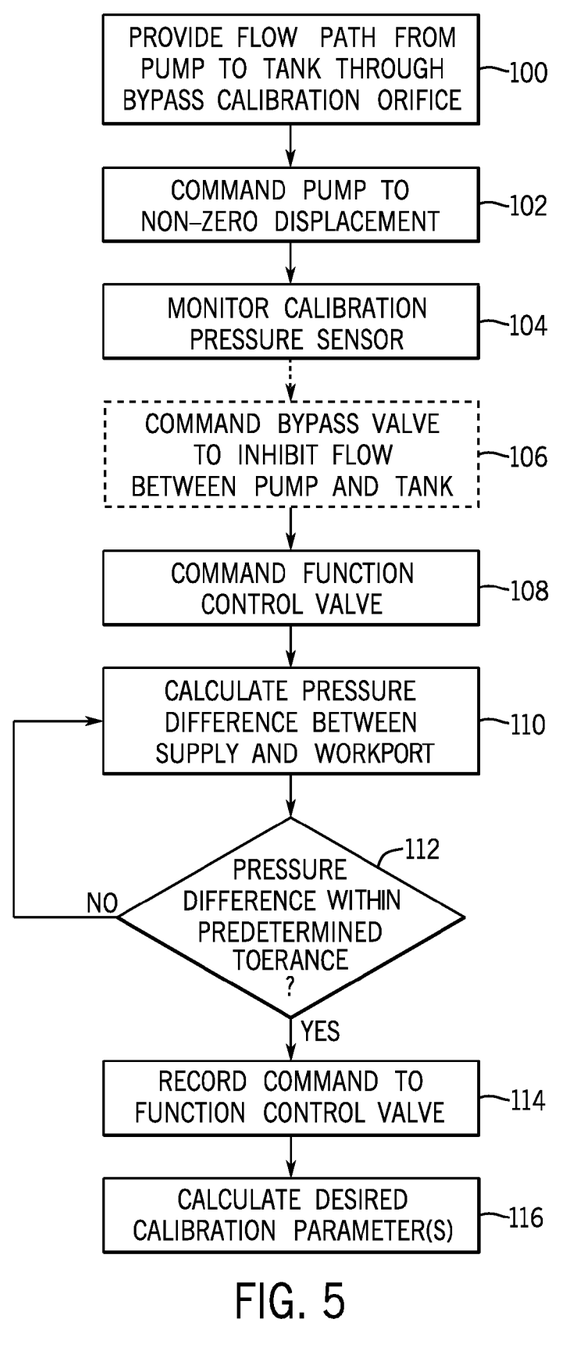
FIG. 5 is a flowchart outlining steps for performing various calibrations for an electrohydraulic valve according to one aspect of the present disclosure.

Operation of the hydraulic system 10 when performing various calibration procedures will be described below with reference to FIGS. 1-6. It should be appreciated that the calibration procedures may also be applied to any other hydraulic system designed using the properties and techniques described herein. As shown in FIG. 5, when a calibration procedure is desired to be initiated, a flow path can be provided from the pump 12 to the reservoir 14 through the bypass calibration orifice 40 at step 100. This may be accomplished by positioning the bypass control valve 26 in the first bypass position 38 and the function control valve 28 may be arranged in the second position 66. With this arrangement of the bypass control valve 26 and the function control valve 28, fluid flow from the pump outlet 20 may be only allowed to flow through the bypass calibration orifice 40 and into the return conduit 24.

Once a flow path is provided between the pump 12 and the reservoir 14 through the bypass calibration orifice 40, the pump 12 may be commanded to a non-zero displacement, thereby providing pressurized fluid flow into the supply conduit 22 at step 102. While the pump 12 is furnishing fluid into the supply conduit 22, the calibration pressure sensor 78 can be monitored at step 104. For example, the controller 48 may monitor and store the pressure values measured by the calibration pressure sensor 78. It should be appreciated that the calibration pressure sensor 78 may be configured to continuously monitor the pressure in the supply conduit 22 and that the order of the steps illustrated in FIG. 5 is not meant to be limiting in any way.

With fluid flowing from the pump 12 to the reservoir 14 through the bypass calibration orifice 40, the calibration pressure sensor 78 may record and store the pressure in the supply conduit 22. The pressure in the reservoir 14 may be known or assumed to be a predetermined value, therefore, the pressure recorded by the calibration pressure sensor 78 at step 104 may be equal to a pressure drop across the bypass calibration orifice 40. Once this reference pressure drop is recorded at step 104, the bypass control valve 26 may be commanded to a position where fluid flow between the pump 12 and the reservoir 14 may be inhibited at step 106. In the illustrated non-limiting example, the bypass control valve 26 may be commanded to the second bypass position 38 at step 106.

With the bypass control valve 26 in a position where fluid flow between the pump 12 and reservoir 14, the function control valve 28 may be commanded (i.e., an electrical signal may be applied thereto by the controller 48 which alters a position of the function spool 50) at step 108. As the function control valve 28 is commanded at step 108, the calibration pressure sensor 78 may measure a pressure in the supply conduit 22 and the controller 48 may calculate a pressure drop between the pump 12 and one of the first workport 56 and the second workport 58 at step 110. In order to facilitate the calculation of a pressure drop between the pump 12 and one of the first workport 56 and the second workport 58, the hydraulic system 10 may be placed in a state where a pressure at the first workport 56 or the second workport 58 is known. This may be achieved, for example, with a looped port, one of the first workport 56 and the second workport 58 connected to the reservoir 14, or positioning the function 16 such that a known pressure exists at one of the first workport 56 and the second workport 58 (based on predetermined tests). Thus, the controller 48 may assume a pressure at one of the first workport 56 and the second workport 58 and the difference between the pressure measured by the calibration pressure sensor 78 and the predetermined, or assumed, pressure at one of the first workport 56 and the second workport 58 may be equal to a pressure drop across the function control valve 28.

As the function control valve 28 continues to be commanded, the controller 48 can determine at step 112 if the calculated pressure drop across the function control valve 28 is within a predetermined tolerance of the pressure drop across the bypass calibration orifice 40 measured at step 104. Once the controller 48 determines that the calculated pressure drop across the function control valve 28 within the predetermined tolerance of the "reference" pressure drop measured across the bypass calibration orifice 40, the command (e.g., a magnitude of an electric current) applied to the function control valve 28 may be recorded by the controller 48. Since the bypass calibration orifice 40 defines a known flow restriction, once the controller 48 determines that the calculated pressure drop across the function control valve 28 is within the predetermined tolerance of the "reference" pressure drop measured across the bypass calibration orifice 40, it can be assumed that the same restriction exists across the function control valve 28 as that defined by the bypass calibration orifice 40. In other words, determining that the measured pressure drop across the function control valve 28 is within a predetermined tolerance of the reference pressure drop across the bypass calibration orifice 40 enables the restriction across the function control valve 28 to be calculated. Thus, the command value recorded at step 114 may be correlated with a known restriction across the function control valve 28 and one or more calibration parameters may be calculated at step 116.

In some non-limiting examples, the predetermined tolerance may be less than or equal to plus or minus 15% of the reference pressure drop. In some non-limiting examples, the predetermined tolerance may be less than or equal to plus or minus 10% of the reference pressure drop. In some non-limiting examples, the predetermined tolerance may be less than or equal to plus or minus 5% of the reference pressure drop. In some non-limiting examples, the predetermined tolerance may be less than or equal to plus or minus 4% of the reference pressure drop. In some non-limiting examples, the predetermined tolerance may be less than or equal to plus or minus 2% of the reference pressure drop. In some non-limiting examples, the predetermined tolerance may be less than or equal to plus or minus 1% of the reference pressure drop.

Figure 6:
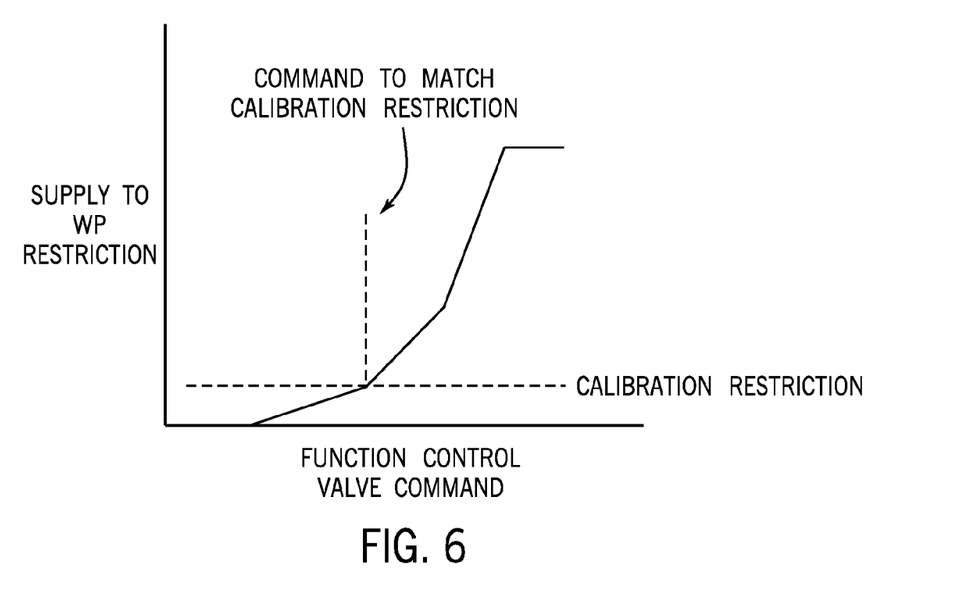
FIG. 6 is a graph illustrating one example of defining a restriction vs. command curve for an electrohydraulic control valve based on a known point on the curve according to one aspect of the present disclosure.

Electrohydraulic control valves may define a known, or predetermined, relationship between a restriction across the control valve and the command applied to the control valve. However, when the control valve is installed into a hydraulic system, the restriction as a function of command must be calibrated to account for variabilities and tolerances within the hydraulic system. Thus, finding or defining one known point on the restriction vs. command curve enables the rest of the curve to be defined and/or the x-intercept of the curve to be defined, as shown in FIG. 6.

Once the command is recorded by the controller 48 at step 114, the controller 48 may use the known, measured restriction and command point to calculate a desired calibration parameter(s) at step 116. For example, the controller 48 may calibrate an offset for the restriction vs. command curve for the function control valve 28. That is, the predetermined restriction vs. command curve for the function control valve 28 may be compensated to intersect the recorded, known restriction and command point. Alternatively or additionally, the controller 48 may calculate an x-intercept of the restriction vs. command curve (i.e., a command that corresponds a "cracking" position of the function control valve 28 where fluid flow initiates therethrough) at step 116. Since the command applied to the function control valve 28 is correlated to a position of the function spool 50, the calibration parameter(s) calculated at step 116 may calibrate a command applied to function control valve 28 with a position of the function spool 50.

As illustrated in FIG. 5, step 106, where the bypass control valve 26 may be commanded to a position where fluid flow between the pump 12 and the reservoir 14 may be inhibited, is drawn using dashed lines. This may indicate that, in some non-limiting examples, the function control valve 28 may be calibrated without closing the bypass control valve 26. In these non-limiting examples, the bypass control valve 26 may remain in the first bypass position 38 where fluid flow is provided through the bypass calibration orifice 40. In this non-limiting example, once the function control valve 28 is commanded at step 108, a second bypass pressure drop across the bypass calibration orifice 40 may also be calculated at step 110. That is, with the bypass control valve 26 still in the first bypass position 38, fluid may flow through both the bypass calibration orifice 40 and the function control valve 28. Since both the pressure in the reservoir 14 and the pressure at one of the first workport 56 and the second workport 58 may be known, the second bypass pressure drop and the pressure drop across the function control valve 28 may be calculated based on the pressure measured by the calibration pressure sensor 78. If the fluid flow rate provided by the pump 12 remains unchanged and the position of the bypass control valve 26 remains unchanged, then the function control valve 28 may be calibrated based on a ratio of the difference between the square root of the reference pressure drop measured at step 104 and the square root of the second bypass pressure drop calculated at step 110 to the square root of the pressure drop between supply and workport calculated at step 110.

With the pump 12 providing a constant fluid flow rate at step 102, the equation for flow through a restriction may be equated for the bypass calibration orifice 40 with no flow through the function control valve 26 (i.e., prior to step 108) and the sum of the bypass calibration orifice 40 and the function control valve 28 (i.e., flow through both the bypass calibration orifice 40 and the function control valve 28 after/during step 108). That is, the fluid flow rate through a restriction is calculated based on the product of a restriction coefficient (i.e., a $C_v$ or $K_v$ value) and the square root of the pressure drop across the restriction. It should be appreciated that the value of the fluid flow rate supplied by the pump 12 at step 102 does not need to be known, it simply needs to remain at a constant value. Since the fluid flow rate is constant, a product of the accurately known restriction coefficient of the bypass calibration orifice 40 and the square root of the reference pressure drop measured at step 104 may be equated to the sum of a product of the restriction coefficient of the bypass calibration orifice 40 and the square root of the second bypass pressure drop measured at step 110 and a product of a restriction coefficient across the function control valve 28 and the square root of the supply to workport pressure drop calculated at step 110. This equation has four known, or measured, quantities (i.e., the bypass calibration orifice 40 coefficient, the reference pressure drop across the bypass calibration orifice 40, the second bypass pressure drop across the bypass calibration orifice 40, and the pressure drop across the function control valve 28) and one unknown (i.e., the restriction across the function control valve 28). Thus, a restriction across the function control valve 28 may be calculated for each command applied thereto. Specifically, the restriction across the function control valve 28 may be equal to a product of the known restriction coefficient of the bypass calibration orifice 40 and a ratio of the difference between the square root of the reference pressure drop across the bypass calibration orifice 40 and the square root of the second bypass pressure drop to the square root of the pressure drop across the function control valve 28.

As described above, the restriction across the function control valve 28 may be calculated for each command applied thereto. Thus, the restriction vs. command curve of the function control valve 28 may be calibrated using one measured point to perform an offset calibration and/or multiple points may be measured to generate a map of the function control valve 28 restriction as a function of a range of commands applied thereto. Since the command applied to the function control valve 28 is correlated to a position of the function spool 50, the calibration procedure(s) may calibrate a command applied to function control valve 28 with a position of the function spool 50.

The systems and methods described herein enable the calibration of an electrohydraulic control valve without the need to monitor or know a fluid flow rate defined by the pump 12. That is, the calibration systems and methods described above may be performed regardless of a fluid flow rate defined by the pump 12. Specifically, measuring a pressure drop across an orifice with a known flow factor, or restriction, (e.g., the bypass calibration orifice 40) enables the pressure drop across a function control valve (e.g., the function control valve 28) to be monitored and utilized for calibration independent of a fluid flow rate provided by the pump 12. Thus, the electrohydraulic control valve calibration systems and method described herein may be unaffected by the pump flow accuracy and/or an accuracy of the calibration pressure sensor 78, since the same state is used on the bypass calibration orifice 40 and the function control valve 28 under calibration.

Further, in the illustrated non-limiting example where the bypass control valve 26 is normally biased into the position where the bypass calibration orifice 40 provides fluid communication between the pump 12 and the reservoir 14, the hydraulic system 10 may be enabled to operate in a "limp home" mode if a failure occurs within the hydraulic system 10 (e.g., wiring or electronic failures). That is, the bypass control valve 26 may default to a position where enough fluid flow can be provided to the function 16 to enable a mobile machine on which the hydraulic system 10 is implemented to continue operation, albeit with reduced capability.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A method for calibrating an electrohydraulic control valve in a hydraulic system, the hydraulic system including a pump, a reservoir, a bypass control valve, and at least one function, wherein the electrohydraulic control valve includes at least one workport in fluid communication with the function, the method comprising:
   providing fluid communication between the pump and the reservoir through a bypass calibration orifice, wherein the bypass calibration orifice defines a known restriction;
   measuring a pressure drop across the bypass calibration orifice;
   commanding the electrohydraulic control valve;
   calculating a pressure drop across the electrohydraulic control valve;
   recording the command applied to the electrohydraulic control valve corresponding with the calculated pressure drop across the electrohydraulic control valve; and
   calibrating the electrohydraulic control valve based on at least two of the recorded command, the known restriction, the measured pressure drop across the bypass calibration orifice, and the calculated pressure drop across the electrohydraulic control valve.

2. The method of claim 1, wherein providing fluid communication between the pump and the reservoir through a bypass calibration orifice comprises:
   arranging the bypass control valve to provide fluid communication between a bypass inlet port and a bypass outlet port through the bypass calibration orifice.

3. The method of claim 2, further comprising:
   arranging the electrohydraulic control valve in a position where fluid communication is inhibited therethrough.

4. The method of claim 1, wherein the bypass control valve is normally biased into a position where fluid communication is provided between the pump and the reservoir through the bypass calibration orifice.

5. The method of claim 1, wherein the bypass calibration orifice defines a fixed orifice with a predetermined flow factor.

6. The method of claim 1, wherein commanding the electrohydraulic control valve comprises:
   applying an electrical signal from a controller to the electrohydraulic control valve.

7. The method of claim 1, further comprising:
   upon providing fluid communication between the pump and the reservoir through a bypass calibration orifice, instructing the pump to provide a non-zero displacement through the bypass calibration orifice.

8. The method of claim 1, further comprising:
   upon measuring a pressure drop across the bypass calibration orifice, commanding the bypass control valve to inhibit fluid communication between the pump and reservoir.

9. The method of claim 8, further comprising:
   determining when the pressure drop across the electrohydraulic control valve is within a predetermined tolerance of the measured pressure drop across the bypass calibration orifice.

10. The method of claim 9, wherein calibrating the electrohydraulic control valve based on at least two of the recorded command, the known restriction, the measured pressure drop across the bypass calibration orifice, and the calculated pressure drop across the electrohydraulic control valve comprises:
    determining that a restriction across the electrohydraulic control valve is similar to the known restriction of the bypass calibration orifice; and
    calibrating a position of the electrohydraulic control valve to the command applied thereto based on the determined restriction across the electrohydraulic control valve.

11. The method of claim 1, wherein calibrating the electrohydraulic control valve based on the recorded command and the known restriction comprises:
    calculating an initial command value that corresponds with fluid flow initiating through the electrohydraulic control valve.

12. The method of claim 1, wherein calibrating the electrohydraulic control valve based on the recorded command and the known restriction comprises:
    calculating a restriction as a function of command curve for the electrohydraulic control valve.

13. The method of claim 1, wherein calibrating the electrohydraulic control valve based on the recorded command and the known restriction comprises:
    compensating a predetermined restriction vs. command curve for the electrohydraulic control valve to intersect the recorded command and known restriction point.

14. The method of claim 1, wherein calibrating the electrohydraulic control valve based on the recorded command and the known restriction comprises:
correlating a command applied to electrohydraulic control valve with a position of a spool of the electrohydraulic control valve.

15. The method of claim 1, further comprising:
arranging the function or the electrohydraulic control valve such that a predetermined pressure exists at the at least one workport.

16. The method of claim 1, further comprising:
calculating a restriction across the function control valve based on the known restriction, the measured pressure drop across the bypass calibration orifice, and the calculated pressure drop across the electrohydraulic control valve.

17. The method of claim 16, wherein calibrating the electrohydraulic control valve based on at least two of the recorded command, the known restriction, the measured pressure drop across the bypass calibration orifice, and the calculated pressure drop across the electrohydraulic control valve comprises:
generating a map of the electrohydraulic control valve restriction as a function of a range of commands applied thereto.

18. A hydraulic system operable to calibrate an electrohydraulic control valve, the hydraulic system comprising:
a pump;
a bypass control valve movable between a first position where fluid communication is provided between the pump and the reservoir through a bypass calibration orifice, and a second position where fluid communication is inhibited between the pump and the reservoir, wherein the bypass calibration orifice defines a known restriction;
a function control valve including at least one workport in fluid communication with a function;
a calibration pressure sensor arranged to measure a pressure downstream of the pump and upstream of the at least one workport; and
a controller in electrical communication with the pump, the bypass control valve, the function control valve, and the calibration pressure sensor, wherein the controller is configured to:
command the pump to a non-zero displacement and command the bypass control valve to the first position;
obtain a reference pressure value from the calibration pressure sensor;
command the function control valve;
calculate a pressure drop across the function control valve;
record a command applied to the function control valve corresponding with the pressure drop across the function control valve; and
calibrate the function control valve based on at least two of the recorded command, the known restriction of the bypass calibration orifice, the reference pressure value, and the pressure drop across the function control valve.

19. The hydraulic system of claim 18, wherein the bypass calibration orifice is a fixed orifice that defines a known flow factor.

20. The hydraulic system of claim 18, wherein the reference pressure value corresponds with a pressure drop across the bypass calibration orifice.

21. The hydraulic system of claim 18, wherein the pressure drop across the function control valve is calculated based on the difference between a pressure value measured by the calibration pressure sensor and a predetermined pressure at the at least one workport.

22. The hydraulic system of claim 18, wherein the controller is further configured to:
compensate a predetermined restriction vs. command curve for the function control valve to intersect the recorded command and known restriction.

23. The hydraulic system of claim 18, wherein the controller is further configured to:
correlate a command applied to function control valve with a position of a spool of the electrohydraulic control valve.

24. The hydraulic system of claim 18, wherein the controller is further configured to:
command the bypass control valve to inhibit fluid communication between the pump and reservoir.

25. The hydraulic system of claim 24, wherein the controller is further configured to:
determine when the pressure drop across the function control valve is within a predetermined tolerance of the measured pressure drop across the bypass calibration orifice.

26. The hydraulic system of claim 25, wherein the controller is further configured to:
determine that a restriction across the function control valve is similar to the known restriction of the bypass calibration orifice; and
calibrate a position of the function control valve to the command applied thereto based on the determined restriction across the function control valve.

27. The hydraulic system of claim 18, wherein the controller is further configured to:
calculate a restriction across the function control valve based on the known restriction, the reference pressure value, and the pressure drop across the function control valve.

28. The hydraulic system of claim 18, wherein the controller is further configured to:
generate a map of the restriction across the function control valve as a function of a range of commands applied thereto.

29. The hydraulic system of claim 18, wherein the controller is further configured to: calculate an initial command value that corresponds with fluid flow initiating through the function control valve.

* * * * *